US012754903B1

(12) United States Patent
Fusco et al.

(10) Patent No.: US 12,754,903 B1
(45) Date of Patent: Oct. 6, 2026

(54) REDUCING THE INPUT PROMPT SIZE FOR A LARGE LANGUAGE MODEL

(71) Applicant: Red Hat, Inc., Raleigh, NC (US)

(72) Inventors: Mario Fusco, Milan (IT); Luca Molteni, Milan (IT)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 19/188,411

(22) Filed: Apr. 24, 2025

(51) Int. Cl.
*G06F 16/242* (2019.01)

(52) U.S. Cl.
CPC ........ *G06F 16/243* (2019.01); *G06F 16/2438* (2019.01)

(58) Field of Classification Search
CPC .......................... G06F 16/243; G06F 16/2438
USPC ........................................................ 707/769
See application file for complete search history.

(56) References Cited

U.S. PATENT DOCUMENTS

2024/0289365 A1* 8/2024 Beauchamp .......... G06F 16/335
2025/0117595 A1* 4/2025 Taheri ..................... G06F 40/40
2025/0117630 A1* 4/2025 Taheri .................. G06N 3/0895
2025/0181619 A1* 6/2025 Jain ........................ G06F 16/383
2025/0378092 A1* 12/2025 Ghalyan ............. G06F 16/3329

* cited by examiner

*Primary Examiner* — Michael Pham
(74) *Attorney, Agent, or Firm* — Kilpatrick Townsend & Stockton LLP

(57) ABSTRACT

The size of an input prompt for a large language model (LLM) can be reduced according to some techniques described herein. As one example, a system can generate a first vector embedding of a natural language query from a user. The system can also generate a second vector embedding of a conversation history between the user and a LLM. The system can then generate a truncated embedding by executing a filtering process based on the first vector embedding and the second vector embedding. The system can generate an input prompt based on the truncated embedding. The system can then execute the LLM based on the input prompt to generate a response to the query. Reducing the size of the input prompt can decrease latency, execution time, and hallucinations associated with the LLM.

20 Claims, 4 Drawing Sheets

REDUCING THE INPUT PROMPT SIZE FOR A LARGE LANGUAGE MODEL

TECHNICAL FIELD

The present disclosure relates generally to machine learning. More specifically, but not by way of limitation, this disclosure relates to reducing the size of an input prompt for a large language model (LLM), which can improve execution time, reduce latency, and improve accuracy.

BACKGROUND

Large Language Models (LLMs) are machine-learning systems trained on large amounts of textual data to understand and respond to natural language queries. These models use deep learning architectures to analyze context, semantics, and syntax, enabling them to perform tasks ranging from text generation to complex reasoning. Their training involves billions or even trillions of parameters, which enables them to capture nuanced relationships between words, phrases, and concepts within a given context.

DETAILED DESCRIPTION

Figure 1:
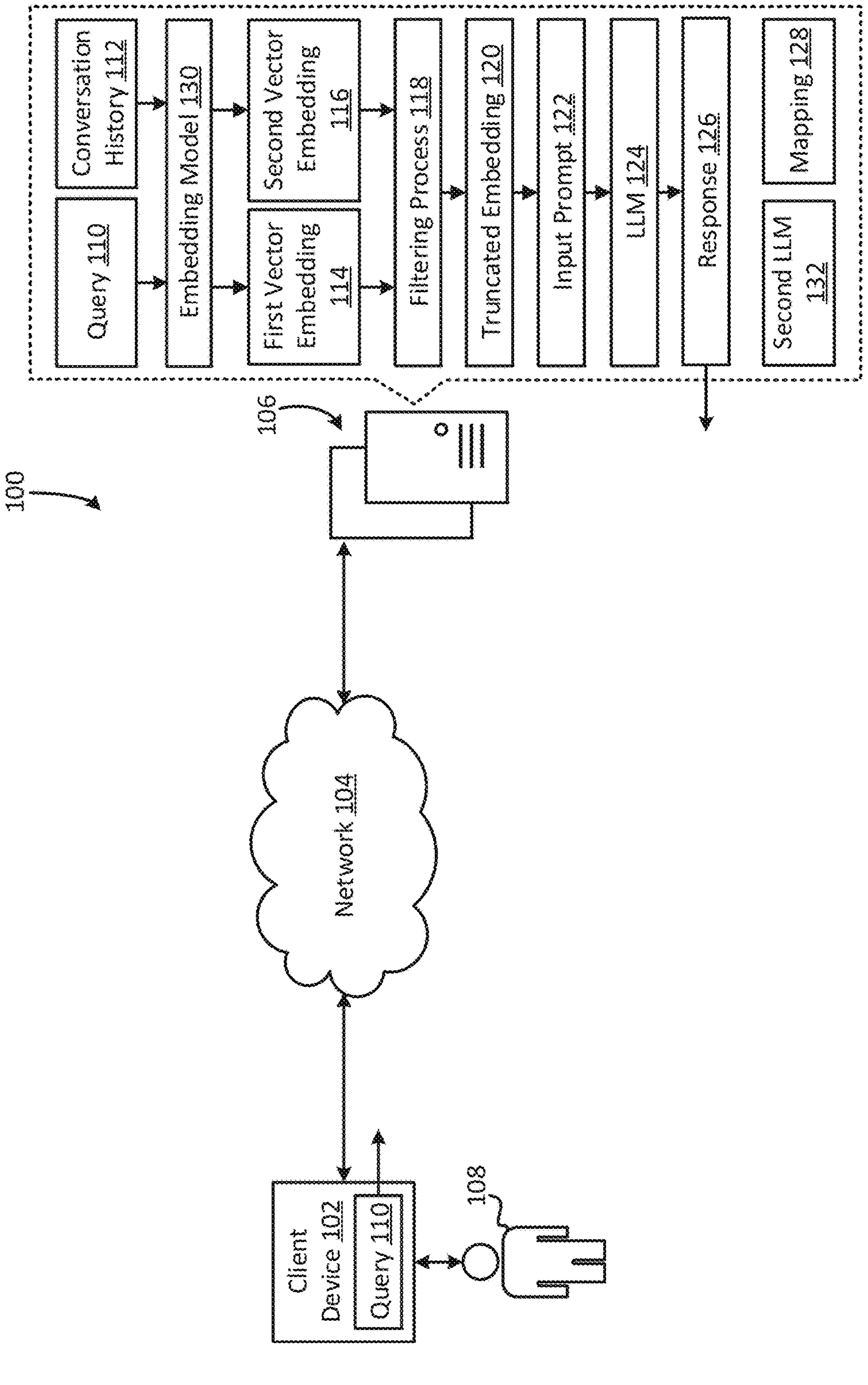
FIG. 1 shows a block diagram of an example of a system for reducing the input prompt size for an LLM according to some aspects of the present disclosure.

Large Language Models (LLMs) have recently gained significant popularity, partly due to their ability to emulate statefulness, in that they appear to "remember" prior conversation history and use it to inform subsequent responses. But LLMs are inherently stateless. Their apparent statefulness is achieved by including the entire conversation history as part of the input for each round of interaction. For example, when a user submits a query to an LLM, the query is typically not provided as a standalone input. Instead, the query is combined with the entire preceding conversation history to form a comprehensive input prompt for the LLM. It is this complete input prompt that serves as the basis for generating the model's response. As the user continues interacting with the LLM by providing additional queries and receiving responses, the conversation history expands, resulting in increasingly larger input prompts for subsequent interactions.

As conversations with an LLM grow longer, the accumulated conversation history, which provides essential context, can become extensive. But LLMs are subject to inherent input limitations, such as a maximum token count for each input prompt. When the size of the conversation history exceeds these input limits, the LLM may truncate portions of the conversation history to fit within the allowable token count. This truncation often involves removing the oldest parts of the conversation, which can result in the loss of valuable contextual information. Additionally, larger input prompts impose greater computational demands, leading to increased latency, higher processing overhead, and potentially greater financial costs (e.g., particularly for LLM services that charge based on the number of input tokens). Further, larger input prompts can contribute to an increased likelihood of hallucinations, where the LLM generates responses that are inaccurate, fabricated, or inconsistent with the conversation's current context. This issue can be exacerbated in lengthy conversations that span multiple topics or perspectives, as the LLM may struggle to maintain coherence and relevance across an overly broad or fragmented input prompt.

Some examples of the present disclosure can overcome one or more of the abovementioned problems by reducing the size of the input prompt for an LLM by selectively retaining key parts of the conversation history while removing less relevant or redundant parts. The disclosed techniques can achieve reductions in input prompt size by 10%, 15%, 25%, or more, without compromising the essential context required for the LLM to generate accurate and relevant responses. By decreasing the size of the input prompt, computational overhead and execution time are also reduced, resulting in lower latency and improved efficiency. Moreover, this process can help mitigate the risk of hallucinations. Overall, the techniques described herein can allow the LLM to more rapidly produce high-quality, context-aware responses with greater accuracy and consistency, even during extended conversations.

As one particular example, a system described herein can receive a query in natural language format from a user. This query can be part of an ongoing natural language conversation with an LLM. For example, this query can be the second interaction in the conversation. The system can transform the query from its natural language format into a first vector embedding. The system can also transform the conversation history from its natural language format into a second vector embedding. Such transformations may be performed by using an embedding model. The system can generate a truncated embedding by applying a filtering process to the second vector embedding. The filtering process evaluates the relevance of different portions of the conversation history relative to the user's query by comparing the first vector embedding with the second vector embedding. For instance, the process can identify and exclude portions of the conversation history that are insufficiently relevant or duplicative of the query. This results in a truncated embedding, which is a reduced version of the second vector embedding that may retain only the most pertinent context. The system can then generate an input prompt based on the first vector embedding (representing the query) and the truncated embedding (representing the filtered conversation history). In some examples, the input prompt may include the truncated embedding itself or a derivative thereof. After generating the input prompt, the system can provide the input prompt as input to the LLM, which can generate a response to the query based on the input prompt. The system can then provide the query response to the user. Because of the smaller size of the truncated embedding (and thus the input prompt), the LLM can consume fewer computing resources (e.g., memory and processing power) in generating the response as compared to processing the entire conversation history. For similar reasons, the likelihood of hallucinations can also be reduced. Moreover, the filtered conversation history can be stored as a refined context and used as the starting point for subsequent iterations, enabling further reductions in input prompt size during extended conversations.

As noted above, in addition to generating a response to the user's query, the system can store the filtered conversation history as a refined version of the original context. This refined context can serve as a starting point for future iterations. Specifically, during subsequent iterations, only the most relevant portions of the previous conversation history—those that survived the filtering process—are used as the basis for generating new input prompts. By systematically carrying forward only the refined context, the system can ensure that each input prompt remains compact and focused, while preserving critical information required for continuity. This iterative refinement process can further reduce the computational overhead associated with processing increasingly lengthy conversations and helps maintain the coherence and relevance of the LLM's responses over extended exchanges. Ultimately, this approach enables the system to handle long conversations more efficiently, while mitigating issues such as hallucinations and loss of contextual accuracy.

In some examples, the filtering process can involve computing distances (e.g., cosine distances or Levenshtein distances) between different portions of the first vector embedding and the second vector embedding. A distance is a measure of similarity between two embedding portions. Each portion may correspond to a phrase, sentence, or paragraph. If the distance between two portions is large, it may mean that they are less similar and less relevant to each other. For instance, it may mean that one of the corresponding sentences is less relevant to the current conversation than the other sentence. Conversely, if the distance is very small, it may mean that the portions are duplicative. For instance, it may mean that one of the corresponding sentences is a near duplicate or identical duplicate of the other sentence. In either scenario, the irrelevant or duplicative portion can be removed. This process allows the system to intelligently eliminate irrelevant and duplicative information, significantly reducing the overall size of the truncated embedding. As a result, the truncated embedding can be significantly smaller (e.g., 10%, 15%, 25%, or more) than the original vector embedding.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

FIG. 1 shows a block diagram of an example of a system 100 for reducing the input prompt size for an LLM 124 according to some aspects of the present disclosure. The system 100 includes a client device 102, such as a laptop computer, desktop computer, tablet, mobile phone, or smart watch. The client device 102 can be operated by a user 108 to engage in a chat conversation with the LLM 124. To that end, the user 108 may input a query 110 for submission to the LLM 124. The client device 102 can transmit the query 110 via one or more networks 104, such as the Internet.

The query 110 can be in a natural language format. For example, the query 110 can include sentences or paragraphs. The query 110 can be considered unstructured text. The query 110 can be the latest query in an ongoing conversation between the user 108 and the LLM 124. The query 110 can correspond to the $N^{th}$ interaction between the user 108 and the LLM 124. Thus, there may have been N−1 prior interactions between the user 108 and the LLM 124. During each of the previous N−1 iterations, the server system 106 may have executed a filtering process (as further described below) on the surviving conversation history from the previous round to further reduce its size, with the result being stored as conversation history 112.

In this example, the server system 106 can receive the query 110. The server system 106 can include one or more servers. The server system 106 can then generate a first vector embedding 114 based on the query 110 and a second vector embedding 116 based on the stored conversation history 112. The first vector embedding 114 can be a vector representation of the query 110, and the second vector embedding 116 can be a vector representation of the stored conversation history 112. As noted above, the stored conversation history 112 may be a truncated version of the full conversation history that only contains the surviving portions from the previous N−1 iterations. To generate the first vector embedding 114 and the second vector embedding 116, the server system 106 can execute an embedding model 130. For example, the server system 106 can execute the embedding model 130 to convert each word in the query 110 into its corresponding vector representation for inclusion in the first vector embedding 114. In some examples, the embedding model 130 can be a machine-learning model (e.g., a neural network) that is separate from the LLM 124. The embedding model 130 can be trained on a set of training data to learn the vector representations of words, which can allow the embedding model 130 to be applied to the query 110 to generate its corresponding vector embedding 114.

The server system 106 can next execute a filtering process 118 designed to generate a truncated embedding 120 from the second vector embedding 116. In some examples, the truncated embedding 120 may be the same data structure as the second vector embedding 116 and may be generated by removing content from the second vector embedding 116. In other examples, the truncated embedding 120 may be a different data structure from the second vector embedding 116 and may be generated separately from the second vector embedding 116. Either way, the truncated embedding 120 can be smaller in size than the second vector embedding 116, without losing any semantically relevant part of the information carried by the original input.

In some examples, the filtering process 118 can involve computing distances between different portions of the first vector embedding 114 and the second vector embedding 116. For example, the server system 106 can select a first vectorized portion of the first vector embedding 114. The first vectorized portion can correspond to a first sentence in the query 110. The server system 106 can also select a second vectorized portion of the second vector embedding 116. The second vectorized portion can correspond to a second sentence in the stored conversation history 112. The server system 106 can then compute a cosine distance or a Levenshtein distance between the two vectorized portions. If the distance between two vectorized portions meets or exceeds a first predefined distance threshold, it may mean that the second sentence has low relevance to the query 110 (and thus the current discussion). Conversely, if the distance between two vectorized portions is below a second predefined distance threshold, it may mean that the sentences are duplicative (e.g., near duplicates or identical duplicates). In either scenario, the server system 106 can exclude the second vectorized portion from the truncated embedding 120, thus reducing its size in comparison to the original second vector embedding 116.

The server system 106 can repeat the above filtering process 118 until a stopping condition is satisfied. Examples of the stopping condition may be that a certain number of iterations have occurred, that the truncated embedding 120 is at least X % (e.g., 10%) smaller in size than the original second vector embedding 116, or that at least a certain amount of the vectorized portions (e.g., 50%) in the original second vector embedding 116 have been evaluated.

The server system 106 can next generate an input prompt 122 based on the truncated embedding 120. For example, the server system 106 can include the first vector embedding 114 and the truncated embedding 120 in the input prompt 122. This may be suitable when the LLM 124 is capable of accepting the truncated embedding 120 as its input, for instance where the input layer of the LLM 124 is configured to accept such vectorized inputs. In other examples, the server system 106 can derive the input prompt 122 from the truncated embedding 120, such that the input prompt 122 is different from the truncated embedding 120. For example, the server system 106 can convert the truncated embedding 120 back into natural language text. The server system 106 can then include the original query 110 and the natural language text version of the truncated embedding 120 in the input prompt 122. This may be suitable when the LLM 124 is capable of accepting natural language text as inputs (e.g., rather than vectorized inputs).

In some examples, the server system 106 can convert the truncated embedding 120 back into natural language text using a mapping 128. The server system 106 may have previously generated the mapping 128 during the embedding stage (when the second vector embedding 116 was generated). The mapping 128 can correlate each text portion of the conversation history 112 to its corresponding vectorized portion in the second vector embedding 116. This mapping 128 can be used in reverse to determine the text portion corresponding to each vectorized portion in the truncated embedding 120. The input prompt 122 can be a concatenation of such text portions. In other examples, the embedding model 130 can be used in reverse to convert the truncated embedding 120 back into its corresponding natural language text. In still other examples, the server system 106 can apply a second LLM 132 (e.g., an auxiliary LLM) to convert the truncated embedding 120 back into its corresponding natural language text. For instance, the truncated embedding 120 can be provided as input to the second LLM 132, which can provide the corresponding natural language text as output. The second LLM 132 can be trained separately from the LLM 124.

After determining the input prompt 122, the server system 106 can provide the input prompt 122 as input to the LLM 124. Based on the input prompt 122, the LLM 124 can generate a response 126 to the query 110. Because the input prompt 122 does not include the full conversation history, the LLM 124 may operate with increased efficiency and accuracy. For example, the LLM 124 may execute faster and generate a more accurate answer when provided with the input prompt 122 as compared to the conventional approaches that include the full conversation history. The server system 106 can then transmit the response 126 to the user 108. For example, the server system 106 can transmit the response 126 to the client device 102, which may output the response 126 on a display for the user 108. The server system 106 may then store the filtered conversation history for use as the starting point in the next iteration of the process. In some examples, the user 108 may view the response 126 and submit a new query to continue the conversation with the LLM 124, at which point the process can repeat.

Figure 2:
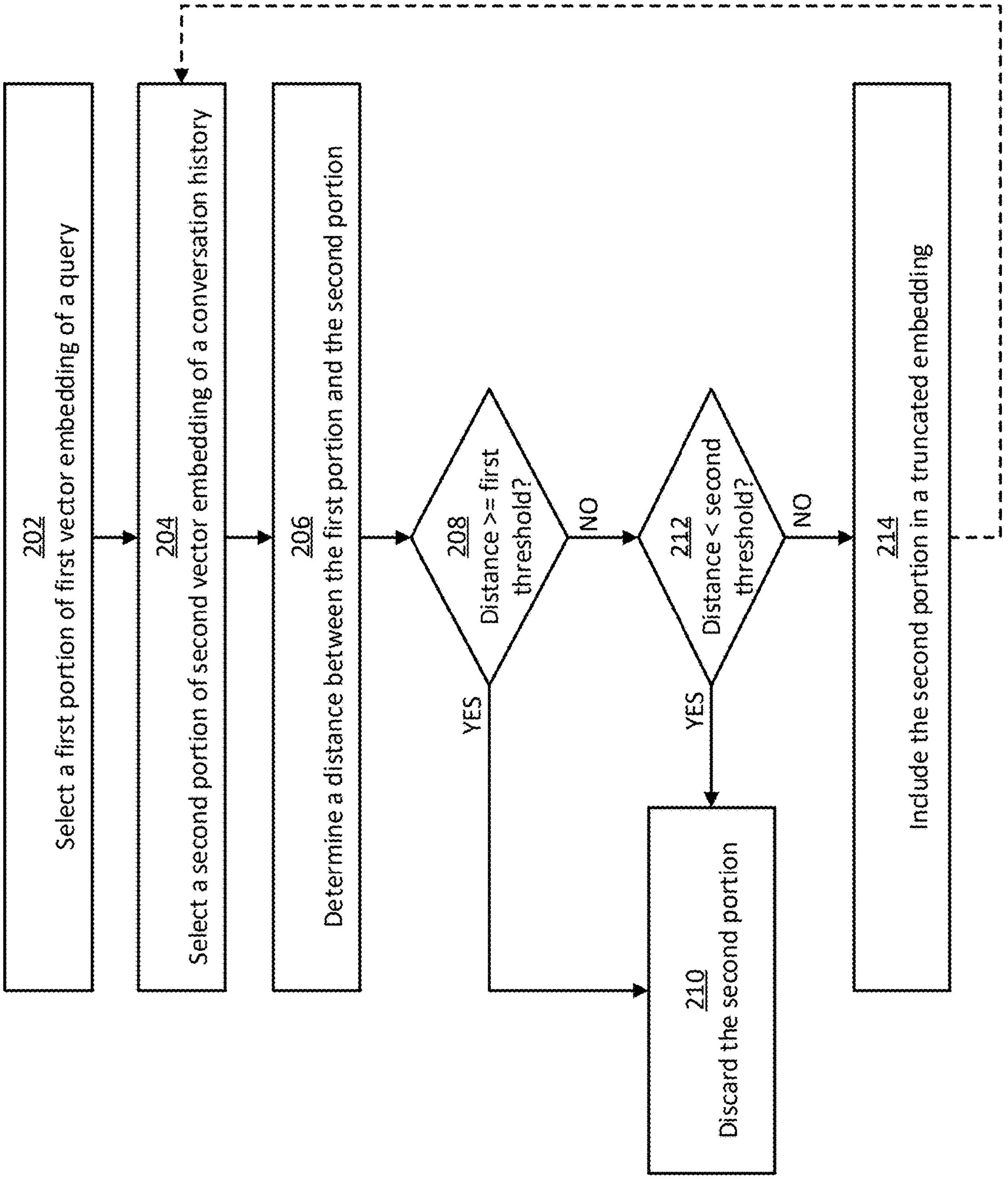
FIG. 2 shows a flowchart of an example of a filtering process for reducing the size of an input prompt for an LLM according to some aspects of the present disclosure.

Turning now to FIG. 2, shown is a flowchart of an example of a filtering process for reducing the size of an input prompt for an LLM according to some aspects of the present disclosure. The operations of FIG. 2 are described below with reference to the components of FIG. 1 described above.

In block 202, the server system 106 selects a first portion of a first vector embedding 114 of a query 110. For example, the server system 106 can determine which portions of the first vector embedding 114 correspond to sentences in the query 110 and select a first portion corresponding to a particular sentence in the query 110.

In block 204, the server system 106 selects a second portion of a second vector embedding 116 of a conversation history 112. For example, the server system 106 can determine which portions of the second vector embedding 116 correspond to sentences in the conversation history 112 and select a second portion corresponding to a particular sentence in the conversation history 112.

In block 206, the server system 106 determines a distance between the first portion and the second portion. The distance can be a numerical score that represents the similarity between the two portions. A higher distance score may indicate less similarity, while a lower distance score may indicate greater similarity. The distance may be a cosine distance or a Levenshtein distance, in some examples.

In block 208, the server system 106 determines whether the distance is greater than or equal to a first predefined distance threshold. The first predefined distance threshold can be associated with extraneous (e.g., irrelevant) content. If the server system 106 determines that the distance is greater than or equal to the first predefined distance threshold, the process can proceed to block 210 where the second portion can be discarded (e.g., excluded from a truncated embedding 120). Otherwise, the process can continue to block 212.

In block 212, the server system 106 determines whether the distance is less than a second predefined distance threshold. The second predefined distance threshold is less than the first predefined distance threshold. The second predefined distance threshold can be associated with duplicative content. If the server system 106 determines that the distance is less than the second predefined distance threshold, the process can proceed to block 210 where the second portion can be discarded (e.g., excluded from a truncated embedding 120). Otherwise, the process can continue to block 214.

In block 214, the server system 106 includes the second portion in the truncated embedding 120. The process may then return to block 202 and iterate. This iterative process can repeat until a stopping condition is satisfied, for example the entire query 110 has been evaluated.

Figure 3:
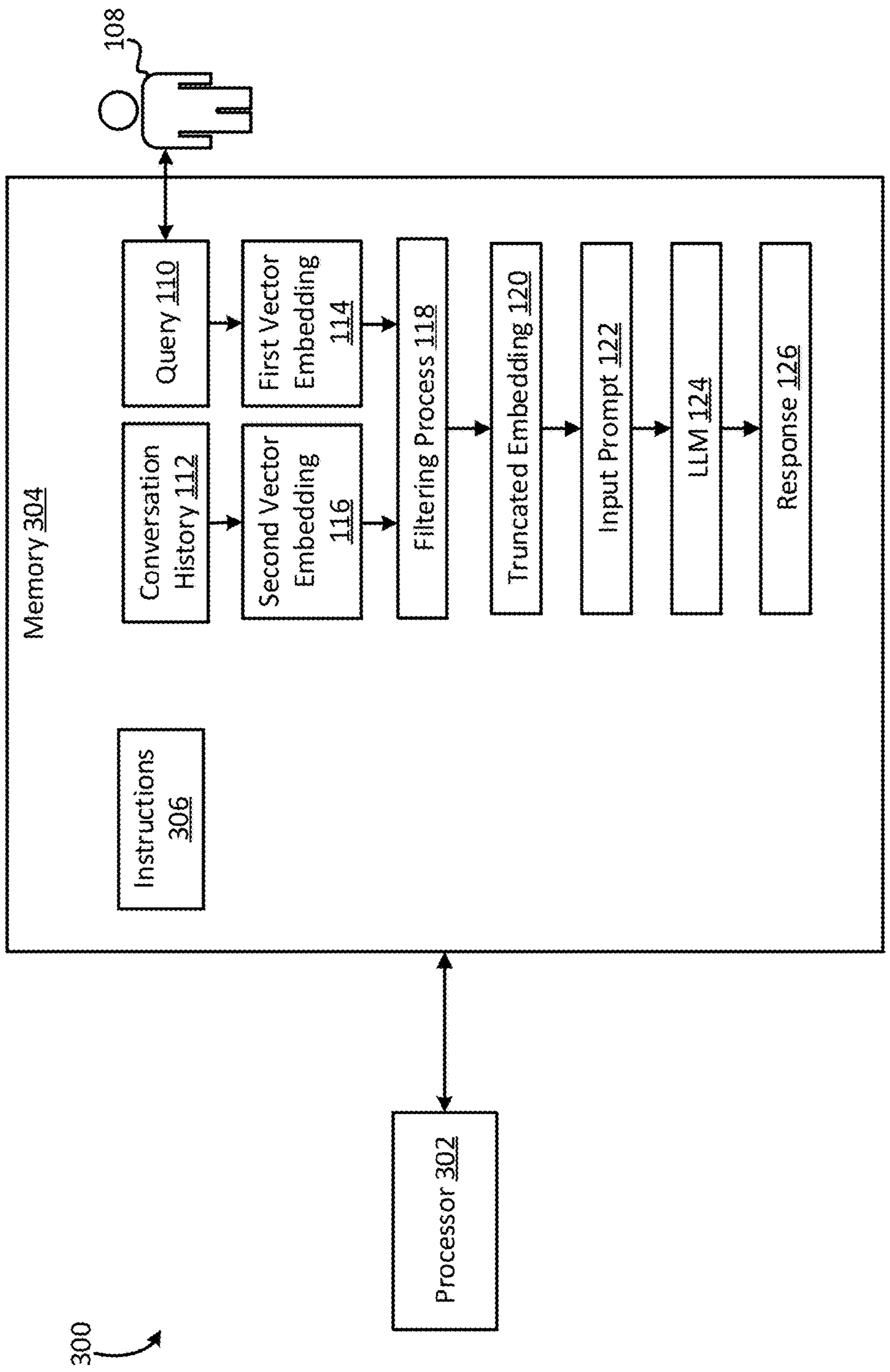
FIG. 3 shows a block diagram of another example of a system for reducing the input prompt size for an LLM according to some aspects of the present disclosure.

Turning now to FIG. 3, shown is a block diagram of another example of a system 300 for reducing the input prompt size for an LLM 124 according to some aspects of the present disclosure. The system 300 includes a processor 302 communicatively coupled to a memory 304. In some examples, the processor 302 and memory 304 may be located in the same physical device, such as a server. In other examples, the processor 302 and memory 304 may be located in different physical devices (e.g., distributed from one another) and communicatively coupled to one another.

The processor 302 can include one processing device or multiple processing devices. Non-limiting examples of the processor 302 include a Field-Programmable Gate Array (FPGA), an application-specific integrated circuit (ASIC), a microprocessor, or any combination of these. The processor 302 can execute instructions 306 stored in the memory 304 to perform operations, such as any of the operations described above with respect to the server system 106 of FIG. 1. In some examples, the instructions 306 can include processor-specific instructions generated by a compiler or an interpreter from code written in any suitable computer-programming language, such as C, C++, C#, Python, or Java.

The memory 304 can include one memory device or multiple memory devices. The memory 304 can be volatile or non-volatile, such that the memory 304 retains stored information when powered off. Non-limiting examples of the memory 304 include electrically erasable and programmable read-only memory (EEPROM), flash memory, or any other type of non-volatile memory. At least some of the memory device includes a non-transitory computer-readable medium from which the processor 302 can read the instructions 306. A computer-readable medium can include electronic, optical, magnetic, or other storage devices capable of providing the processor 302 with computer-readable instructions or other program code. Non-limiting examples of a computer-readable medium can include magnetic disks, memory chips, ROM, random-access memory (RAM), an ASIC, a configured processor, optical storage, or any other medium from which a computer processor can read the instructions 306.

In some examples, the processor 302 can execute the instructions 306 to perform one or more operations. For example, the processor 302 can generate a first vector embedding 114 of a natural language query 110 from a user 108. The processor 302 can also generate a second vector embedding 116 of a conversation history 112 (e.g., a portion of the full conversation history or the full conversation history) between the user 108 and the LLM 124. The processor 302 can then generate a truncated embedding 120 by executing a filtering process 118 based on the first vector embedding 114 and the second vector embedding 116. The processor 302 can generate an input prompt 122 based on the truncated embedding 120. For example, the processor 302 may include the truncated embedding 120 itself or a derivative thereof in the input prompt 122. The processor 302 can then execute the LLM 124 based on the input prompt 122 to generate a response 126 to the query 110. For example, the processor 302 can provide the input prompt 122 as input to the LLM 124, which can generate and output the response 126 to the query 110 based on the input prompt 122.

Figure 4:
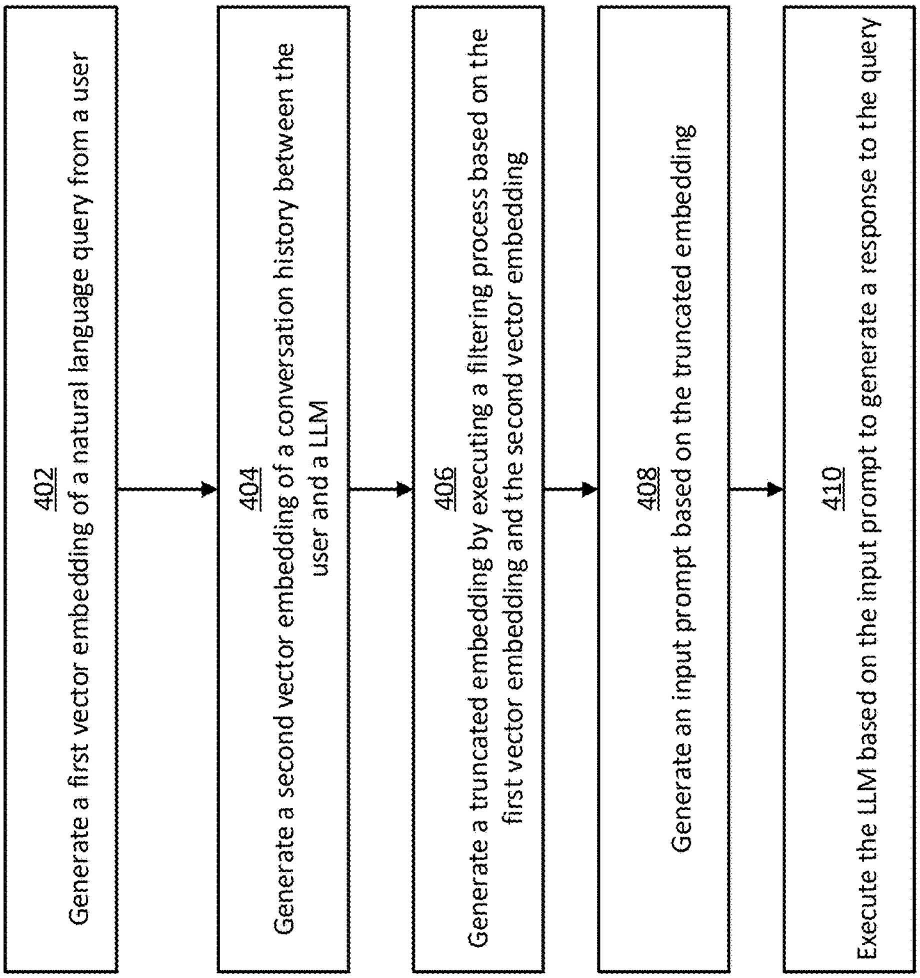
FIG. 4 shows a flowchart of an example of a process for reducing the input prompt size for an LLM according to some aspects of the present disclosure.

Turning now to FIG. 4, shown is a flowchart of an example of a process for reducing the input prompt size for an LLM according to some aspects of the present disclosure. Other examples may involve more operations, fewer operations, different operations, or a different sequence of operations than is shown in FIG. 4. The operations of FIG. 4 are described below with reference to the components of FIG. 3 described above.

In block 402, the processor 302 generates a first vector embedding of a natural language query 110 from a user 108.

In block 404, the processor 302 generates a second vector embedding 116 of a conversation history 112 (e.g., a portion of the full conversation history or the full conversation history) between the user 108 and the LLM 124. Blocks 402-404 may be performed by executing an embedding model, which may have previously been trained using a set of training data. The embedding model can be separate from the LLM 124.

In block 406, the processor 302 generates a truncated embedding 120 by executing a filtering process 118 based on the first vector embedding 114 and the second vector embedding 116. In some examples, the filtering process 118 may be distance-based, similar to the process shown in FIG. 2.

In block 408, the processor 302 generates an input prompt 122 based on the truncated embedding 120. For example, the processor 302 may include the truncated embedding 120 itself in the input prompt 122. As another example, the processor 302 may convert the truncated embedding 120 into corresponding natural language text for use in the input prompt 122. This may be achieved via a mapping, an auxiliary LLM, the embedding model used in block 404, or a different embedding model.

In block 410, the processor 302 executes the LLM 124 based on the input prompt 122 to generate a response 126 to the query 110. For example, the processor 302 can provide the input prompt 122 as input to the LLM 124, which can output the response 126 to the query 110 based on the input prompt 122. The LLM 124 may have previously been trained using a set of training data.

In some examples, the processor 302 can store the filtered conversation history (corresponding to the truncated embedding 120) for use as the starting point in the next iteration of the above process. That way, each subsequent iteration only operates on the surviving portions of the conversation history from the previous iterations.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure. For instance, any examples described herein can be combined with any other examples to yield further examples.

The invention claimed is:

1. A non-transitory computer-readable medium comprising program code that is executable by one or more processors for causing the one or more processors to perform operations including:

receiving a natural language query from a user during a conversation between the user and a large language model (LLM); and based on receiving the natural language query, generating a response to the natural language query at least in part by:

generating a first vector embedding of the natural language query from the user;

generating a second vector embedding of a conversation history associated with the conversation;

after generating the first vector embedding and the second vector embedding, generating a truncated embedding based on the second vector embedding, wherein generating the truncated embedding involves executing a filtering process that excludes a portion of the second vector embedding from the truncated embedding based on a comparison between the portion of the second vector embedding and at least a portion of the first vector embedding;

generating an input prompt based on the truncated embedding; and executing the LLM based on the input prompt to generate the response to the natural language query.

2. The non-transitory computer-readable medium of claim 1, wherein the filtering process involves:

selecting a first portion of the first vector embedding and a second portion of the second vector embedding;

determining a distance between the first portion and the second portion, wherein the distance is a similarity measure between the first portion and the second portion;

determining whether the distance meets or exceeds a predefined distance threshold associated with extraneous portions; and in response to determining that the distance meets or exceeds the predefined distance threshold, excluding the second portion as extraneous from the truncated embedding.

3. The non-transitory computer-readable medium of claim 2, wherein the distance is a cosine distance or a Levenshtein distance.

4. The non-transitory computer-readable medium of claim 1, wherein the filtering process involves:

selecting a first portion of the first vector embedding and a second portion of the second vector embedding;

determining a distance between the first portion and the second portion, wherein the distance is a similarity measure between the first portion and the second portion;

determining whether the distance is below a predefined distance threshold associated with duplicative portions; and in response to determining that the distance is below the predefined distance threshold, excluding the second portion as duplicative from the truncated embedding.

5. The non-transitory computer-readable medium of claim 1, wherein the input prompt includes the truncated embedding in a vector format.

6. The non-transitory computer-readable medium of claim 1, wherein the operation of generating the input prompt based on the truncated embedding involves:

deriving a natural language version of the truncated embedding; and including the natural language version of the truncated embedding in the input prompt.

7. The non-transitory computer-readable medium of claim 5, wherein the operations further comprise:

accessing a mapping that correlates text portions of the conversation history to their corresponding embedding portions in the truncated embedding; and for each embedding portion in the truncated embedding:

determining a corresponding text portion from the conversation history using the mapping; and incorporating the corresponding text portion into the input prompt.

8. The non-transitory computer-readable medium of claim 1, wherein the operations further comprise:

generating the first and second vector embeddings by executing an embedding model on the natural language query and the conversation history, respectively.

9. A method comprising:

receiving, by one or more processors, a natural language query from a user during a conversation between the user and a large language model (LLM); and based on receiving the natural language query, generating, by the one or more processors, a response to the natural language query at least in part by:

generating, by one or more processors, a first vector embedding of the natural language query from the user;

generating, by the one or more processors, a second vector embedding of a conversation history associated with the conversation;

after generating the first vector embedding and the second vector embedding, generating, by the one or more processors, a truncated embedding based on the second vector embedding, wherein generating the truncated embedding involves executing a filtering process that excludes a portion of the second vector embedding from the truncated embedding based on a comparison between the portion of the second vector embedding and at least a portion of the first vector embedding;

generating, by the one or more processors, an input prompt based on the truncated embedding; and executing, by the one or more processors, the LLM based on the input prompt to generate the response to the natural language query.

10. The method of claim 9, wherein the filtering process involves:

selecting a first portion of the first vector embedding and a second portion of the second vector embedding;

determining a distance between the first portion and the second portion, wherein the distance is a similarity measure between the first portion and the second portion;

determining whether the distance meets or exceeds a predefined distance threshold associated with extraneous portions; and in response to determining that the distance meets or exceeds the predefined distance threshold, excluding the second portion as extraneous from the truncated embedding.

11. The method of claim 10, wherein the distance is a cosine distance or a Levenshtein distance.

12. The method of claim 9, wherein the filtering process involves:

selecting a first portion of the first vector embedding and a second portion of the second vector embedding;

determining a distance between the first portion and the second portion, wherein the distance is a similarity measure between the first portion and the second portion;

determining whether the distance is below a predefined distance threshold associated with duplicative portions; and in response to determining that the distance is below the predefined distance threshold, excluding the second portion as duplicative from the truncated embedding.

13. The method of claim 9, wherein the input prompt includes the truncated embedding in a vector format.

14. The method of claim 9, wherein the operation of generating the input prompt based on the truncated embedding involves:

deriving a natural language version of the truncated embedding; and including the natural language version of the truncated embedding in the input prompt.

15. The method of claim 14, further comprising:

accessing a mapping that correlates text portions of the conversation history to their corresponding embedding portions in the truncated embedding; and for each embedding portion in the truncated embedding:

determining a corresponding text portion from the conversation history using the mapping; and incorporating the corresponding text portion into the input prompt.

16. The method of claim 9, further comprising:

generating the first and second vector embeddings by executing an embedding model on the natural language query and the conversation history, respectively.

17. A system comprising:

one or more processors; and one or more memories storing instructions that are executable by the one or more processors for causing the one or more processors to perform operations including:

receiving a natural language query from a user during a conversation between the user and a large language model (LLM); and based on receiving the natural language query, generating a response to the natural language query at least in part by:

generating a first vector embedding of the natural language query from the user;

generating a second vector embedding of a conversation history associated with the conversation;

after generating the first vector embedding and the second vector embedding, generating a truncated embedding based on the second vector embedding, wherein generating the truncated embedding involves executing a filtering process that excludes a portion of the second vector embedding from the truncated embedding based on a comparison between the portion of the second vector embedding and at least a portion of the first vector embedding;

generating an input prompt based on the truncated embedding; and executing the LLM based on the input prompt to generate the response to the natural language query.

18. The system of claim 17, wherein the filtering process involves:

selecting a first portion of the first vector embedding and a second portion of the second vector embedding, wherein the second portion corresponds to the portion of the second vector embedding used in the comparison;

performing the comparison by determining a distance between the first portion and the second portion, wherein the distance is a similarity measure between the first portion and the second portion;

determining whether the distance meets or exceeds a predefined distance threshold associated with extraneous portions; and in response to determining that the distance meets or exceeds the predefined distance threshold, excluding the second portion as extraneous from the truncated embedding.

19. The system of claim 17, wherein the filtering process involves:

selecting a first portion of the first vector embedding and a second portion of the second vector embedding, wherein the second portion corresponds to the portion of the second vector embedding used in the comparison;

performing the comparison by determining a distance between the first portion and the second portion, wherein the distance is a similarity measure between the first portion and the second portion;

determining whether the distance is below a predefined distance threshold associated with duplicative portions; and in response to determining that the distance is below the predefined distance threshold, excluding the second portion as duplicative from the truncated embedding.

20. The system of claim 17, wherein the operation of generating the input prompt based on the truncated embedding involves:

deriving a natural language formatted version of the truncated embedding; and including the natural language formatted version of the truncated embedding in the input prompt.

* * * * *